US012809016B2

(12) United States Patent
Watt et al.

(10) Patent No.: US 12,809,016 B2
(45) Date of Patent: Nov. 24, 2026

(54) METHOD AND SYSTEM FOR DETERMINING THE IDENTITY AND LOCATION OF AN OBJECT IN A SEARCH SPACE

(71) Applicant: Waters Technologies Corporation, Milford, MA (US)

(72) Inventors: Micah I. Watt, Holliston, MA (US); Benjamin Yeats, Melbourn (GB); Simon Shakespeare, Melbourn (GB); Benjamin Walker, Melbourn (GB); David Pooley, Melbourn (GB); Daniel Crichton, Melbourn (GB)

(73) Assignee: Waters Technologies Corporation, Milford, MA (US)

( * ) Notice: Subject to any disclaimer, the term of this patent is extended or adjusted under 35 U.S.C. 154(b) by 400 days.

(21) Appl. No.: 18/112,147

(22) Filed: Feb. 21, 2023

(65) Prior Publication Data

US 2023/0266459 A1 Aug. 24, 2023

Related U.S. Application Data

(60) Provisional application No. 63/312,539, filed on Feb. 22, 2022.

(51) Int. Cl.
*G01S 13/75* (2006.01)
*G06K 7/10* (2006.01)

(52) U.S. Cl.
CPC ........ *G01S 13/758* (2013.01); *G06K 7/10316* (2013.01)

(58) Field of Classification Search
CPC .............. G01S 13/758; G06K 7/10316; G06K 7/10356; G06K 7/10099
See application file for complete search history.

(56) References Cited

U.S. PATENT DOCUMENTS 7,573,418 B2 8/2009 Kawai et al.
7,932,830 B2 4/2011 Campero et al.
(Continued)

FOREIGN PATENT DOCUMENTS

CN 109254264 A 1/2019
CN 110555959 B 12/2021
(Continued)

OTHER PUBLICATIONS

Sawadi, Amar, "An RFID Directional Antenna for Location Positioning," 2012, Electronic Theses and Dissertations. 138, University of Windsor, Canada.
(Continued)

*Primary Examiner* — Resha Desai
*Assistant Examiner* — Naomi M Wolford
(74) *Attorney, Agent, or Firm* — Schmeiser Olsen, LLP

(57) ABSTRACT

Described are examples of a method and a system for locating and identifying an object in a search space. The method may be used to determine the presence, identity and relative location of a consumable item. The method uses an array of RFID antennas to interrogate the search space in which one or more objects having an attached RFID tag may be present. The RFID antennas transmit RF signals into the search space and detect RFID reply signals from RFID tags. RFID antennas can be operated at different receiver sensitivity gains or transmit power gains to define additional cell locations within the search space. The identity and location of the objects is determined from the detected RFID reply signals. In various applications, the location is determined in a linear search space, a two-dimensional search space or a three-dimensional search space according to array configuration and gain implementation.

19 Claims, 7 Drawing Sheets

(56) References Cited

U.S. PATENT DOCUMENTS

| | | | | | |
|---|---|---|---|---|---|
| 8,044,804 | B1 * | 10/2011 | McReynolds | G01S 13/04 340/8.1 |
| 8,197,750 | B2 * | 6/2012 | Trueeb | B01L 9/06 343/702 |
| 8,305,192 | B2 * | 11/2012 | Connolly | G06K 7/10386 340/10.41 |
| 9,715,608 | B2 | 7/2017 | Koch | |
| 11,043,093 | B2 | 6/2021 | Hewett | |
| 2005/0246094 | A1 | 11/2005 | Moscatiello | |
| 2009/0027202 | A1 | 1/2009 | Copeland et al. | |
| 2012/0092134 | A1 | 4/2012 | Stern et al. | |
| 2012/0293307 | A1 | 11/2012 | Djuric et al. | |
| 2013/0049925 | A1 | 2/2013 | Subramanian | |
| 2014/0361078 | A1 | 12/2014 | Davidson | |
| 2015/0332570 | A1 | 11/2015 | Nelson et al. | |
| 2020/0386725 | A1 * | 12/2020 | Ozbal | G01N 30/82 |

FOREIGN PATENT DOCUMENTS

| | | | | |
|---|---|---|---|---|
| EP | 3916616 | A1 * | 12/2021 | G06K 19/0724 |
| WO | WO-2014006417 | A1 * | 1/2014 | G06K 7/10336 |

OTHER PUBLICATIONS

International Preliminary Report on Patentability in PCT/US2023/013498 mailed on Sep. 6, 2024.

International Search Report and Written Opinion in PCT/US2023/013498 mailed on May 31, 2023.

Examination Report in European Patent Application No. 23712119.9 mailed on Feb. 27, 2026.

* cited by examiner

METHOD AND SYSTEM FOR DETERMINING THE IDENTITY AND LOCATION OF AN OBJECT IN A SEARCH SPACE

RELATED APPLICATION

This application claims the benefit of the earlier filing date of U.S. Provisional Patent Application Ser. No. 63/312,539 filed Feb. 22, 2022 and titled "Method and System for Determining the Identity and Location of an Object in a Search Space," the entirety of which is incorporated herein by reference.

FIELD OF THE INVENTION

The disclosed technology relates generally to a system for automatically detecting and identifying RFID tagged objects in a search space and determining the location of the objects within the search space. More particularly, the technology relates to systems based on selective activation and modulation of signals generated with an RFID antenna array for objects used with analytical instrumentation.

BACKGROUND

Regulatory entities often require accurate records indicating the products used in performing analytical chromatographic separations and associating these products with the corresponding test results. Recording the unique device identification (UDI) information for these products is typically done by hand and requires careful transcription of data. Errors can occur during this process and the captured UDI information may not accurately indicate the products associated with the chromatographic test results.

SUMMARY

In one aspect, a method for locating and identifying an object in a search space includes providing an array of radio frequency identification (RFID) antennas adjacent to a search space that may include one or more RFID tags each secured to an object. Each of the RFID antennas is configured to transmit a radio frequency (RF) signal into a subspace of the search space and to receive a reply signal from RFID tags that may be present in the subspace. For each RFID antenna, an RF signal is transmitted into a respective one of the subspaces of the search space and one or more RFID reply signals are detected if one or more RFID tags are present in the respective subspace. Each RFID reply signal includes identification data for a respective one of the RFID tags. An identity and location for one or more objects in the search space is determined in response to the detected RFID reply signals.

The method may further include repeating one or more times, for each RFID antenna, the steps of transmitting of the RF signal and detecting one or more RFID reply signals, wherein, for each repetition, a gain of the RFID antenna is different from prior values of the gain and wherein the subspace is determined by the gain. The subspace of one of the RFID antennas may overlap a subspace of one or more of the other RFID antennas for a same gain. The gain of each RFID antenna may be a receiver sensitivity gain or a transmit power gain. For each repetition of the steps of transmitting of the RF signal and detecting one or more RFID reply signals, the gain may be decreased from a preceding gain and the subspace for each RFID antenna may be decreased in response to the decrease in the gain. For each repetition of the steps of transmitting of the RF signal and detecting one or more RFID reply signals, transmitting an RF signal from an RFID antenna into a subspace may be omitted if there is no RFID reply signal detected for the RFID antenna according to a first occurrence or prior repetition of transmitting the RF signal from the RFID antenna into the respective subspace.

The array of RFID antennas may be a linear array and the search space may be a linear space. Alternatively, the array of RFID antennas may be a linear array and the search space may be a two-dimensional space and each subspace may include a portion of an area defining the two-dimensional space.

The array of RFID antennas may be a two-dimensional array and the search space may be a three-dimensional space. Each subspace may include a portion of a volume defining the three-dimensional space.

In another aspect, a system for locating and identifying an object in a search space includes an array of RFID antennas and a computing system. Each of the RFID antennas is configured to transmit an RF signal into a subspace of a search space and to receive a reply signal from RFID tags that may be present in the subspace. The computing system is in communication with the array of RFID antennas and is configured, for each RFID antenna, to cause a transmission of an RF signal into a subspace of the search space and to detect one or more RFID reply signals at the RFID antenna if one or more RFID tags are present in the respective subspace. Each RFID reply signal includes identification data for a respective one of the RFID tags. The computing system is further configured to determine an identity and location for the RFID tags in the search space in response to the detected RFID reply signals.

The system may be further configured to repeat one or more times, for each RFID antenna, the transmission of the RF signal and the detection of the one or more reply signals, wherein a gain of the RFID antenna is different from prior values of the gain. The gains of the RFID antennas may be receiver sensitivity gains or transmit power gains.

Each RFID tag may be affixed to an object. An RFID reply signal from an RFID tag may include identification data.

The computing system may include a memory module configured to store the identity and the location of the one or more RFID tags in the search space. The computing system may include a user interface to display data corresponding to the identity and the location of the one or more RFID tags in the search space.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1:
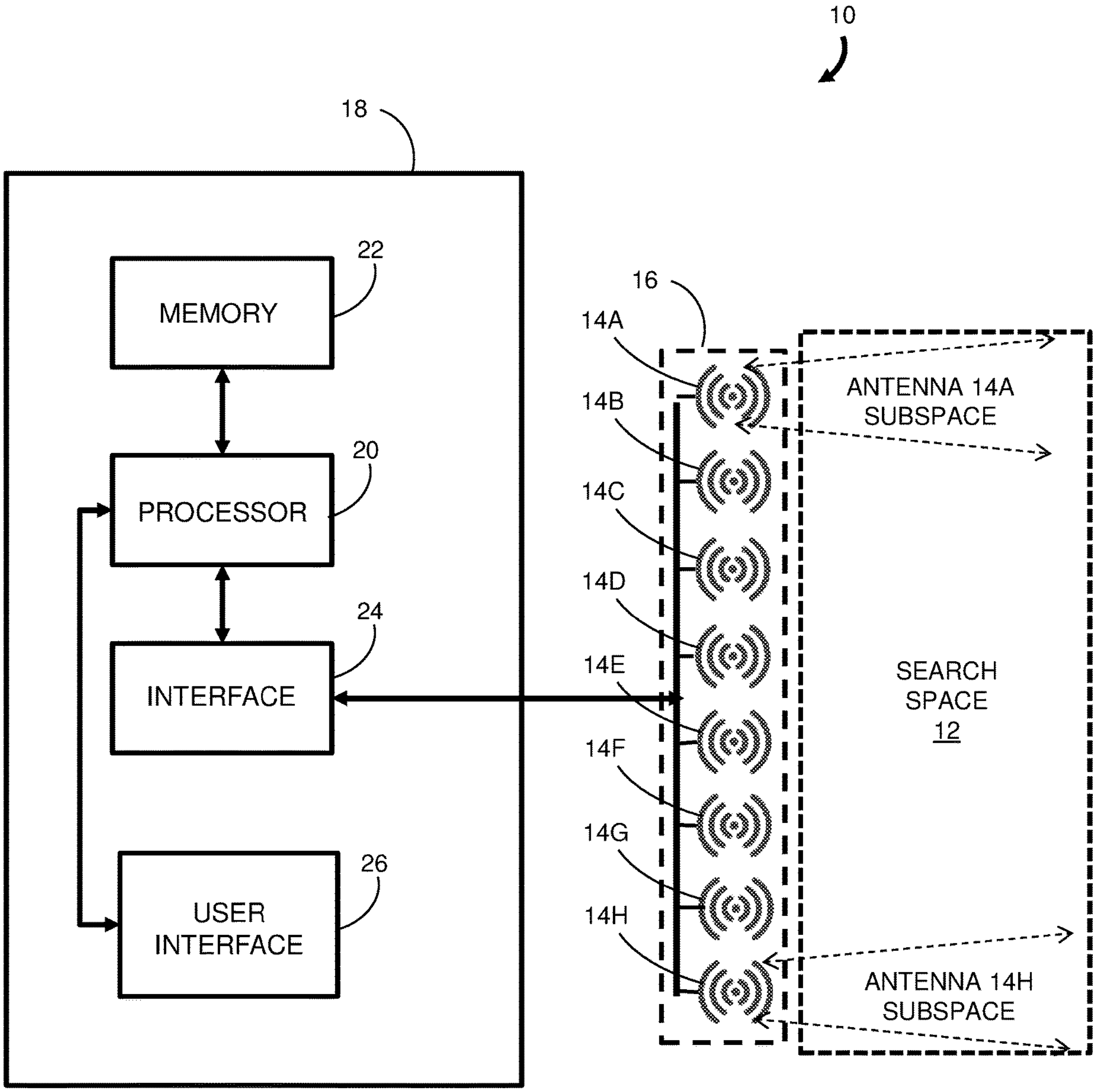
FIG. 1 is a block diagram of an example of a system for locating and identifying an object in a search space.

Reference in the specification to an embodiment or example means that a particular feature, structure or characteristic described in connection with the embodiment or example is included in at least one embodiment or example of the teaching. References to a particular embodiment or example within the specification do not necessarily all refer to the same embodiment or example.

The present teaching will now be described in detail with reference to exemplary embodiments or examples thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. Those of ordinary skill having access to the teaching herein will recognize additional implementations, modifications, and embodiments, as well as other fields of use, which are within the scope of the present disclosure as described herein.

In brief overview, embodiments and examples disclosed herein are directed to methods and systems for locating and identifying one or more objects in a search space. For example, the method may be used to determine the presence, identity and relative location of a consumable item. Examples of the method use an array of RFID antennas to interrogate a search space in which one or more objects having an attached RFID tag may be present. The RFID antennas transmit RF signals into the search space and are used to detect RFID reply signals from any RFID tags in the search space. The identity and location of the objects in the search space are determined from the detected RFID reply signals.

Advantageously, the method and system are applicable to all laboratory environments having a defined search space and in which a UDI for objects in the search space is logged. One example of such an application is the use of analytical columns in liquid chromatography systems used to perform chromatographic separations in accordance with regulatory requirements.

As used herein, an RFID antenna means an antenna that transmits an electromagnetic signal to automatically identify and track an object having an attached RFID tag. An RFID tag includes a small radio transponder, radio receiver and transmitter. In response to receiving an RF pulse transmitted by a nearby RFID antenna (e.g., an RFID reader), the RFID tag transmits an RFID reply signal. The reply signal is typically a digital signal that can be read by the RFID antenna. The reply signal generally includes an identification number associated with the tag and thereby enables detection and identification of an object to which the tag is attached.

As used herein, an array of RFID antennas generally means a linear array of two or more RFID antennas or a two-dimensional array of RFID antennas having at least two RFID antennas arranged along each of two orthogonal axes although in some examples the RFID antenna array may include coplanar antennas that are not linearly arranged. Search space means an area or a volume adjacent to an array of RFID antennas in which objects to be detected and located may be present. For example, the search space may be a two-dimensional space in which objects with RFID tags may be located. The two-dimensional space (i.e., plane) may be adjacent to a linear array of RFID antennas. It will be understood that objects near to but not precisely in the plane defining the two-dimensional space may be determined to be located within the two-dimensional space. In an alternative example, the search space may be a three-dimensional space (i.e., a volume) located adjacent to one side of a two-dimensional array of RFID antennas.

An antenna subspace means a region of a search space into which an RFID antenna transmits an RF signal and from which the RFID antenna can receive an RFID reply signal from an RFID tag in that region. Thus, the entirety of a search space is defined as the aggregate of the subspaces for all the RFID antennas in the antenna array. Coupling distance means the maximum distance from an RFID antenna at which an RFID tag can receive the transmitted RF signal and broadcast an RFID reply signal that can be detected by the RFID antenna. Antenna gain, as used herein, means the gain of an RFID antenna defined by the antenna transmit power and the antenna receiver sensitivity. Coupling distance is therefore dependent on the antenna gain. Thus, the subspace is increased for a higher antenna gain and decreased for a lower antenna gain.

The methods described below have applications to analytical systems such as liquid chromatography systems. For example, a chromatographic column may be installed in a column manager that includes a column oven used to control the temperature of the column during a chromatographic separation. The column is disposed in a column trough inside the oven. A linear array of RFID antennas can be positioned inside the oven, for example, on the inside of the oven door, to enable operation where the search space is defined inside the column trough. The column is fitted with an RFID tag that contains identification information (e.g., a UDI) to identify a particular column. The RFID tag is "read" by one or more of the RFID antennas. Thus, the specific column used (e.g., the serial number of the column) can be automatically determined and stored in a database to comply with record keeping requirements. Optionally, the properties and characteristics of the column associated with that column can be retrieved and displayed to a user. In some implementations, the liquid chromatography system can use multiple columns inside the oven. For example, one column may be an analytical column and the second column may be a guard column. An RFID tag may be affixed to each column and be associated with a unique identifier for the column.

In another example, a liquid chromatography system includes a sample manger with multiple sample plates each having multiple wells, vials or the like to hold samples for analysis. An RFID tag may be affixed to each plate to enable determination of its presence, identification information and location within the sample manager.

In yet another example, sample tracking can be achieved by affixing an RFID tag on each vial in a sample tray. Thus, each sample can be uniquely identified and its location within the sample tray determined.

The RFID tags used in various implementations may vary. For example, tags in a coil configuration may be affixed to chromatography columns. Other RFID tags, such as label tags attached to items by adhesives may be used. In the various examples described herein, the RFID tags are passive and do not include a power source. The RFID tag receives an RF signal, converts the received RF signal into useful energy and broadcasts an RF reply signal. Alternatively, RFID tags having their own independent power sources may be used as well as hybrid RFID tags, which have the capability to charge from electromagnetic energy transmitted from other antennas. The principles described herein are independent of the particular type of RFID tags used. The selection of a particular type of tag to use may be based on the transmission and receiver characteristics of the RFID antennas, the dimensions of the search space, the size and geometry of the items to which the tags are attached and cost considerations.

FIG. 1 is a block diagram of an example of a system 10 for locating and identifying an object in a search space 12. The system 10 includes a linear array 16 of eight RFID antennas 14A to 14H (generally 14). Each of the antennas 14 is configured to transmit an RF signal into an antenna subspace and to receive a reply signal from one or more RFID tags (not shown) that may be present in the corresponding antenna subspace. Generally, each RF signal is at the same frequency as the other RF signals, but this is not a requirement. Although only two subspaces are shown in the figure, it will be recognized that there are a total of eight subspaces that in aggregate define the full search space 12.

The system 10 further includes a computing system 18 in communication with the array 16 of RFID antennas 14. The computing system 18 includes a processor 20 and a memory module 22. Additionally, an interface module 24 may be included and, in some embodiments, may be part of the computing system. The interface module 24 may include components to allow for the exchange of analog and/or digital signals between the processor 20 and the array 16. A user interface 26 may be provided to enable a user to initiate the process of determining identity and location of objects in the search space 12, to enter parameters for executing the process and to display textually and/or graphically data resulting from execution of the process, including object identities and locations in the search space 12. The user interface 26 may also be used to set parameters for and initiate execution of an analytical instrument utilizing one or more objects in the search space.

The computing system 18 is configured to selectively cause a transmission of an RF signal from each RFID antenna 14 into its subspace and to detect RFID reply signals at the RFID antenna 14. The interface module 24 enables the processor 20 to control functions of the RFID antennas 14, including control of the transmit power of the RF signals and the receiver sensitivity for sensing RFID reply signals. Each RFID reply signal includes identification data (e.g., UDI data) for a corresponding RFID tag located in the associated antenna subspace. The memory module 22 may store the identity and/or the location of the RFID tags determined to be in the search space.

Figure 2:
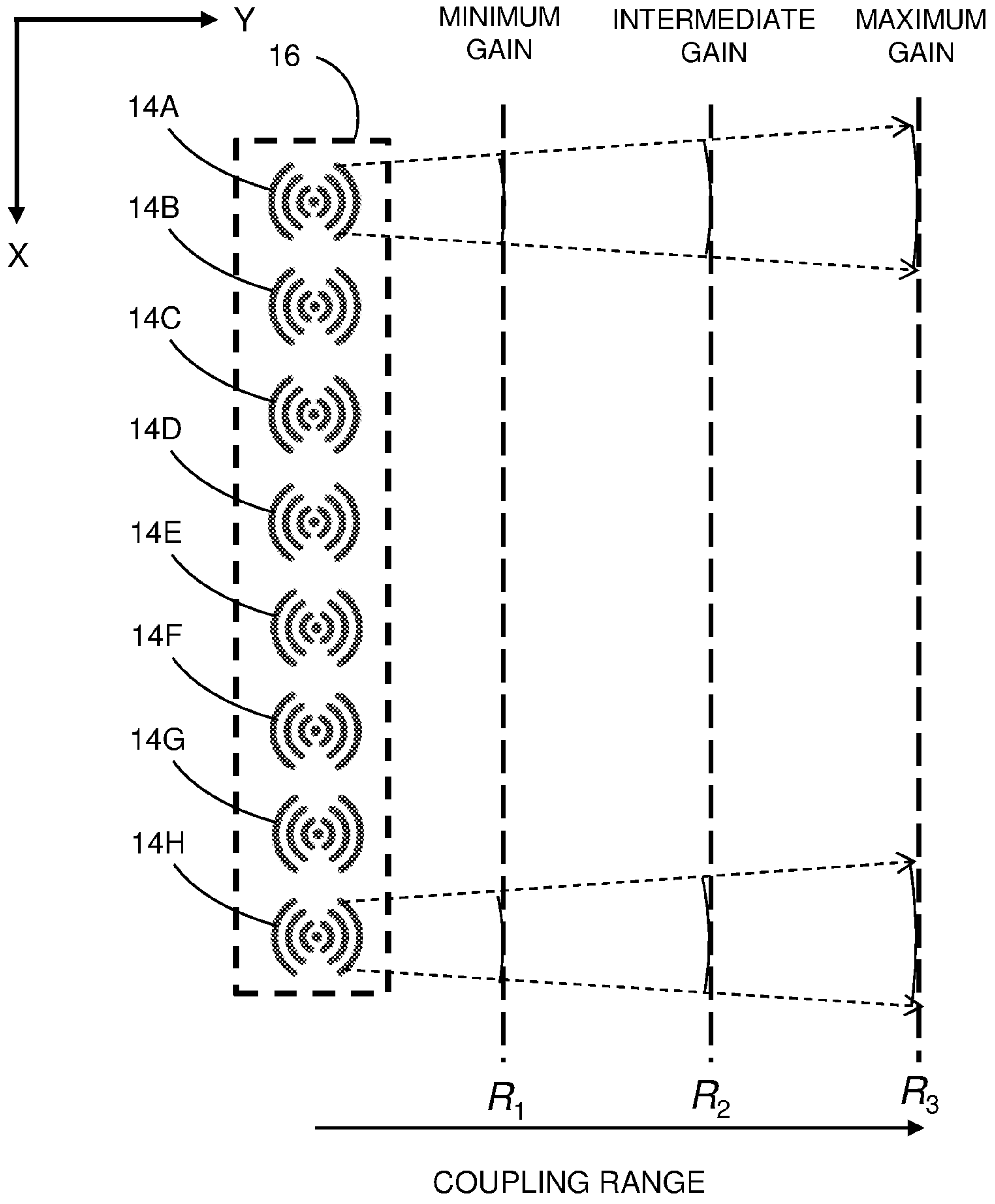
FIG. 2 shows an example of the subspaces for two RFID antennas in a linear RFID array operated at three different antenna gains.

Reference is made to FIG. 2 which shows an example of the subspaces for two of the RFID antennas 14A and 14H for a linear RFID array 16 operated at three different antenna gains. It will be understood that each of the other RFID antennas 14B to 14G have similarly defined subspaces.

The subspace for an RFID antenna 14 lies within a two-dimensional search space and is defined by a coupling range R, or maximum distance from the RFID antenna 14, at which an RFID tag can receive and effectively reply to a transmitted RF signal from the RFID antenna 14. At the minimum antenna gain, the coupling range $R_1$ is smallest and the subspace corresponds to the region extending from the RFID antenna 14 out to a minimum coupling range $R_1$. For the intermediate antenna gain, each subspace spans a region from the antenna 14 out to an intermediate coupling range $R_2$. Thus, the subspace at the intermediate antenna gain includes the full subspace defined for the minimum antenna gain. For the maximum antenna gain, the subspace spans the region between the antenna 14 and a maximum coupling range $R_3$. Consequently, the subspace at the maximum antenna gain includes the subspaces defined for the minimum and intermediate antenna gains.

Figure 3:
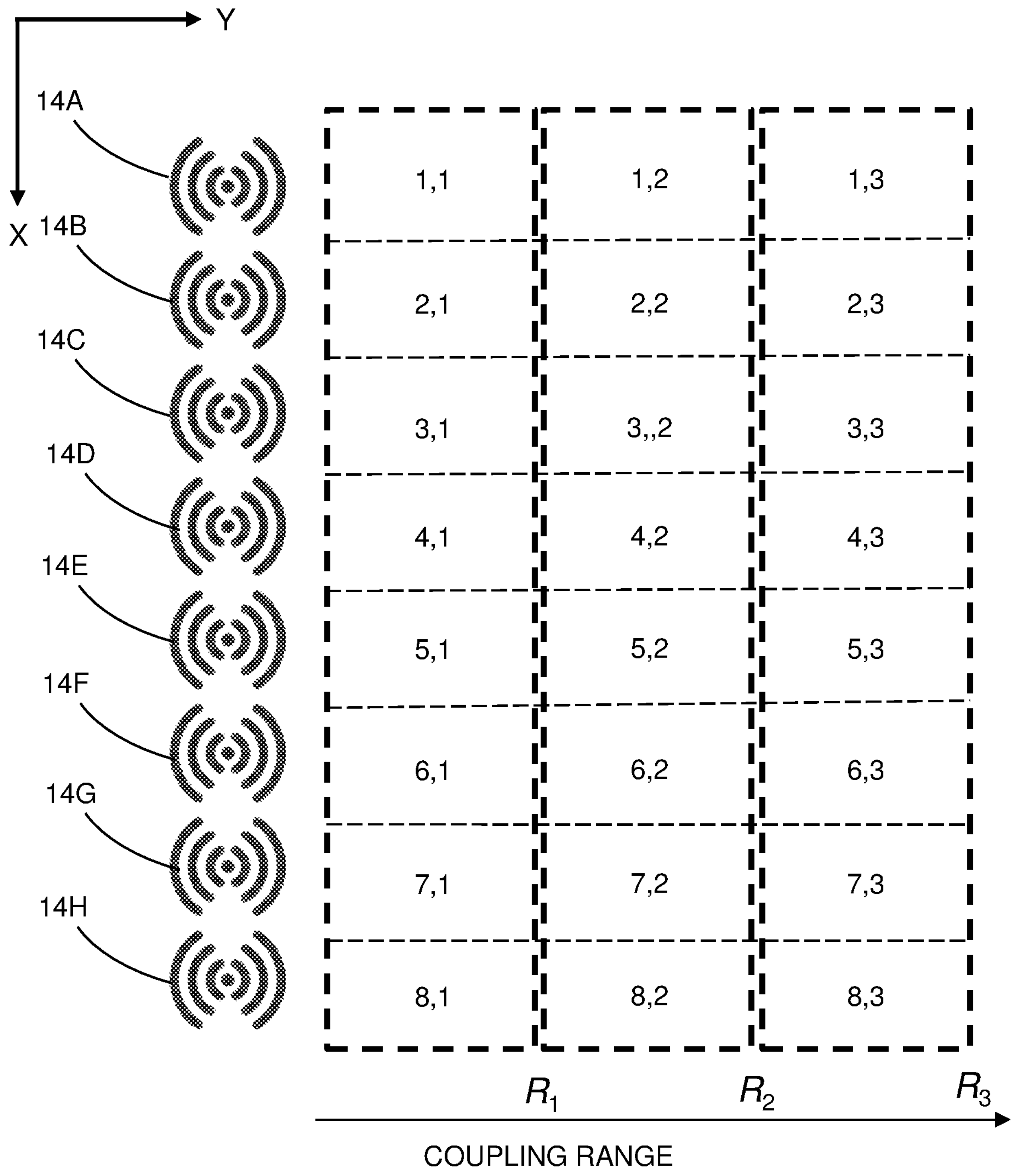
FIG. 3 is a graphical depiction of location cells in a search space for a linear array of eight RFID antennas operated at three different antenna gains.

By using three different antenna gains, it is possible to determine the location of an RFID tagged object within the search space to be in one of three regions associated with each RFID antenna 14. For the eight RFID antennas 14 operating at three different antenna gains, the search space is defined by an 8×3 array of location cells in which to determine the location of RFID tagged objects, as shown in FIG. 3. Each cell coordinate (x,y) corresponds to a particular RFID antenna 14 as defined along an x-axis and a distance from the linear array along a y-axis. It will be appreciated that using a different number of RFID antennas and/or a different number of antenna gains results in a different number of location cells. In addition, the physical spaces corresponding to the location cells are determined according to the spacing of the RFID antennas and the values of antenna gain.

Figure 4:
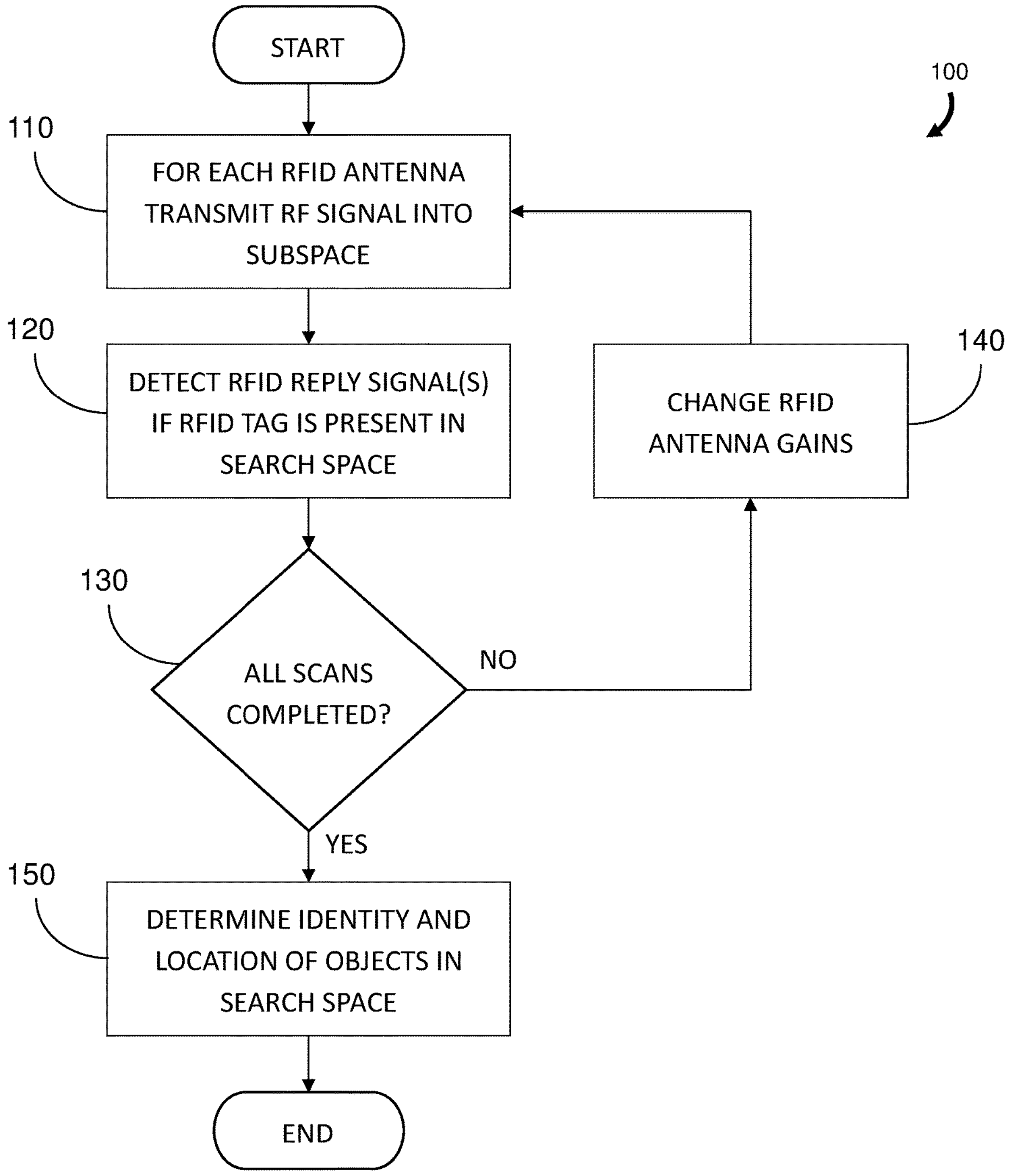
FIG. 4 is a flowchart representation of an example of a method for locating and identifying an object in a search space.

FIG. 4 is a flowchart representation of an example of a method 100 for locating and identifying an object in a search space. The search space may be populated with one or more RFID tags each secured to an object. The method 100 includes transmitting (110) from each RFID antenna an RF signal into a respective antenna subspace and detecting (120) RFID reply signals from any RFID tags in the subspace of the antenna. An execution of steps 110 and 120 defines a single scan of the RFID antenna array. If it is determined (130) that at least one more scan remains to be performed, the method 100 proceeds by changing (140) the antenna gains of the RFID antennas. In a preferred implementation, the antenna gain for each scan is reduced from the prior antenna gain. The method 100 cycles through steps 140, 110 and 120 for each additional scan until the desired number of scans are completed. For example, for operation with three different antenna gains (FIG. 2), a total of three scans are performed. Subsequently, the identity and location of objects having RFID tags and disposed within the search space are determined (150).

In one example in which each scan is decreased in antenna gain from that of the preceding scan, the transmitting (110) and detecting (120) are omitted for any RFID antennas for which no reply signals were detected in a previous scan at a higher antenna gain. This omission of steps 110 and 120 results in a more rapid execution of the method 100.

Figure 5:
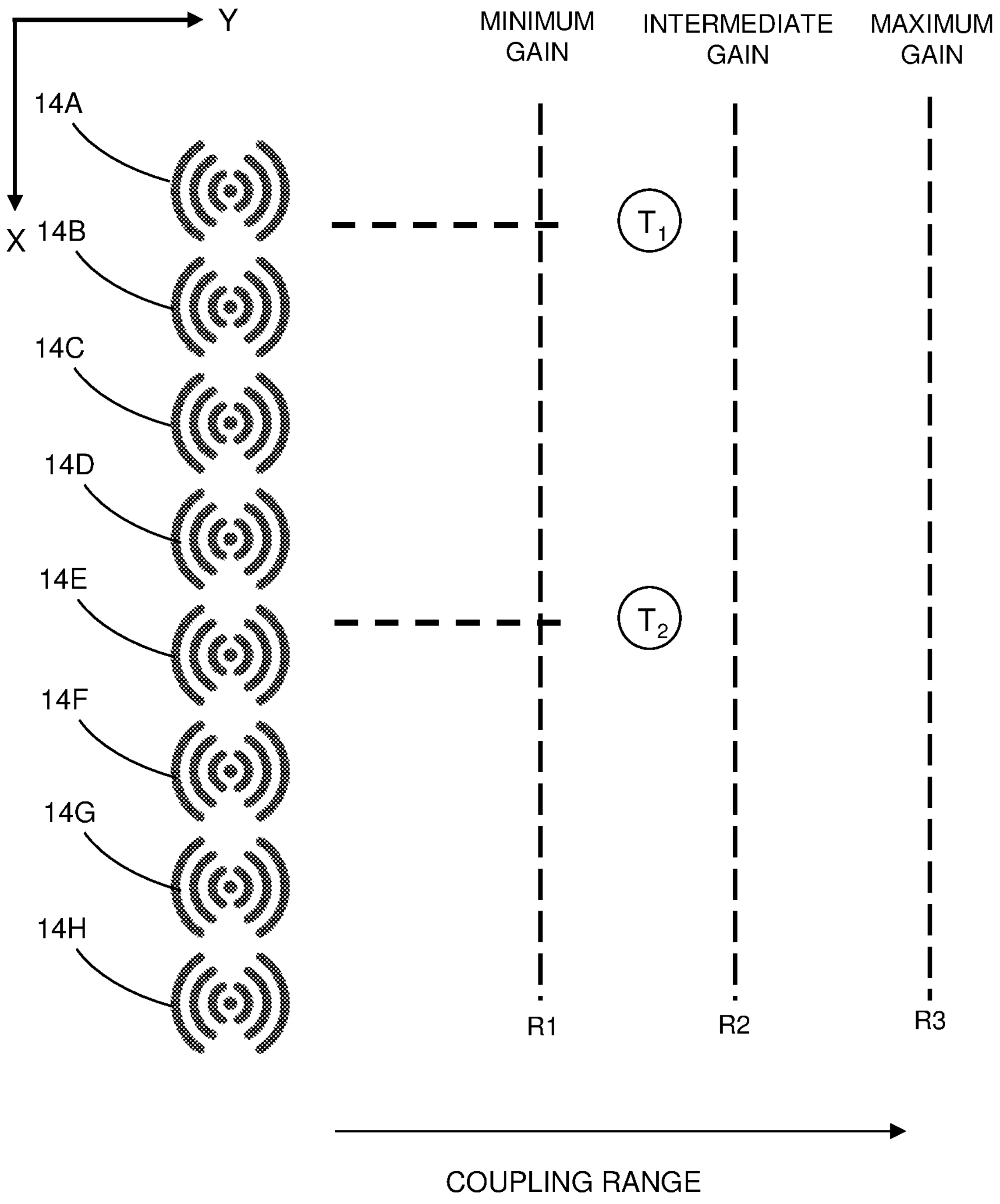
FIG. 5 graphically depicts an example of a search space that is adjacent to a linear array of eight RFID antennas and includes two RFID tags.

FIG. 5 schematically illustrates an example of a search space adjacent to a linear array of eight RFID antennas 14. One RFID tag T1 is present at a position closest to RFID antenna 14A and a second RFID tag T2 is present at a position closest to RFID antenna 14E. Both tags T1 and T2 are at approximately the same distance from the axis of the linear array. Table 1 summarizes the detected RFID signals for the example. The activation order from one to eight corresponds to activation of RFID antennas 14A to 14H, respectively. Scan 1 is performed at the highest antenna gain and therefore corresponds to the largest antenna subspaces (see FIG. 2) while Scan 3 is performed at the lowest antenna gain and therefore corresponds to the smallest antenna subspaces.

TABLE 1

| ANTENNA | ACTIVATION ORDER | SCAN 1 (Highest Gain) | SCAN 2 (Middle Gain) | SCAN 3 (Lowest Gain) |
|---|---|---|---|---|
| 14A | 1 | TAG T1 | TAG T1 | — |
| 14B | 2 | TAG T1 | — | — |
| 14C | 3 | — | — | — |
| 14D | 4 | TAG T2 | — | — |
| 14E | 5 | TAG T2 | TAG T2 | — |
| 14F | 6 | — | — | — |
| 14G | 7 | — | — | — |
| 14H | 8 | — | — | — |

Scan 1 results in a detection of RFID reply signals at RFID antennas 14A, 14B, 14D and 14E. Scan 2 results in detection of RFID reply signals only at RFID antennas 14A and 14E. Scan 3 does not yield any detections of RFID signals. It should be recognized that there may be some overlap in the antenna subspaces for adjacent RFID antennas 14 thereby leading to an RFID reply signal being detected by two adjacent RFID antennas when an RFID tag is located approximately midway between the antennas. For example, each location cell in FIG. 3 may have a small overlap along the x-axis with an adjacent location cell although generally this is not a problem when the RFID tags are located close to the RFID antennas 14 and are therefore in the near-field of the transmitted RF signals.

Note that Scan 2 could be performed using only the four RFID antennas that received RFID reply signals during Scan 1 because the first scan interrogates all three location cells and the absence of RFID reply signals for an RFID antenna eliminates the need to operate at lower antenna gains for the RFID antenna. Similarly, Scan 3 could be performed using only RFID antennas 14A and 14E.

The locations of Tag T1 and Tag T2 can be determined from Table 1. Tag T1 is located on a line that is orthogonal to the antenna array at a position between RFID antennas 14A and 14B although the location is closer to RFID antenna 14A based on its detection in Scan 2. Similarly, Tag T2 is located on a line orthogonal to the antenna array at a position between RFID antennas 14D and 14E although the location is closer to RFID antenna 14E based on its detection in Scan 2. No tags are in the location cells closest to the antenna array based on the absence of RFID reply signals during Scan 3. Specifically, Tag T1 is determined to be in location cell (1,2) and Tag T2 is determined to be in location cell (5,2) (see FIG. 3).

Figure 6:
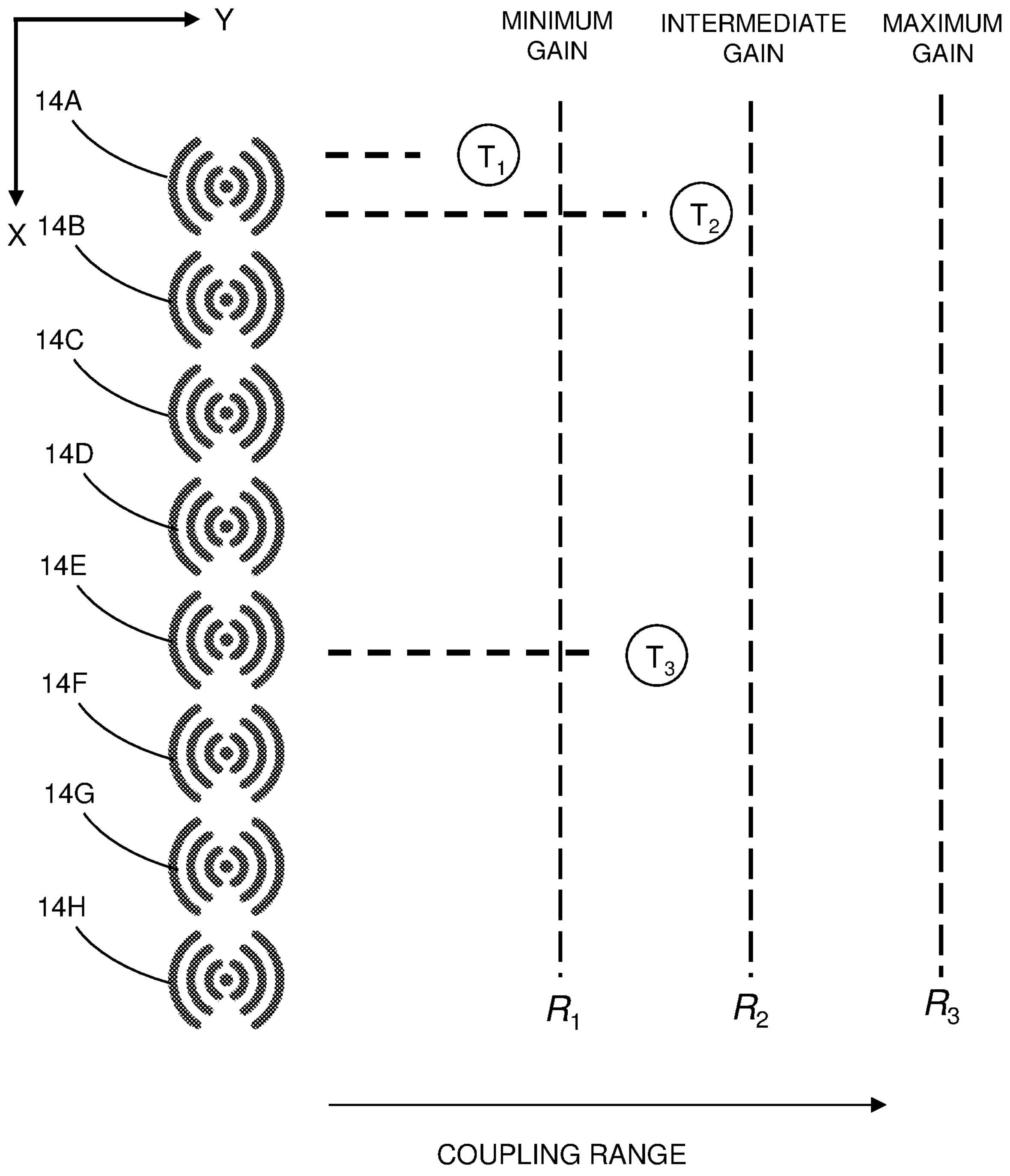
FIG. 6 graphically depicts an example of a search space that is adjacent to a linear array of eight RFID antennas and includes three RFID tags.

FIG. 6 schematically illustrates another example of a search space adjacent to a linear array of eight RFID antennas 14. In this example, two RFID tags T1 and T2 are present at positions that are closest to RFID antenna 14A and a third RFID tag T3 is present at a position closest to RFID antenna 14E. Tag T1 is closest to the axis of the linear array while Tag T3 is farthest from the axis of the linear array. Table 2 summarizes the detected RFID signals. Again, Scan 1 is performed at the highest antenna gain, Scan 2 is performed at an intermediate antenna gain and Scan 3 is performed at the lowest antenna gain.

TABLE 2

| ANTENNA | ACTIVATION ORDER | SCAN 1 (Highest Gain) | SCAN 2 (Middle Gain) | SCAN 3 (Lowest Gain) |
|---|---|---|---|---|
| 14A | 1 | TAG T1, TAG T2 | TAG T1, TAG T2 | TAG T1 |
| 14B | 2 | TAG T1, TAG T2 | TAG T2 | — |
| 14C | 3 | — | — | — |
| 14D | 4 | — | — | — |
| 14E | 5 | TAG T3 | TAG T3 | — |
| 14F | 6 | — | — | — |
| 14G | 7 | — | — | — |
| 14H | 8 | — | — | — |

Scans 1 and 2 yield a detection of RFID reply signals at RFID antennas 14A, 14B and 14E. Scan 3 results in detection of an RFID reply signal only at RFID antenna 14A. Based on the absence of RFID reply signals for RFID antennas 14C, 14D, 14F, 14G and 14H during Scan 1, Scans 2 and 3 could be performed without activating these five RFID antennas.

The location of Tags T1, T2 and T3 can be determined from Table 2. Tags T1 and T2 are located on a line that is orthogonal to the antenna array at a position nearest to RFID antenna 14A and Tag T3 is located on a line orthogonal to the antenna array at a position nearest to RFID antenna 14E. Specifically, Tag T1 is in location cell (1,1), Tag T2 is in location cell (1,2) and Tag T3 is in location cell (5,2) (see FIG. 3).

In an alternative example, the RFID antennas are arranged in a two-dimensional array with each antenna transmitting an RF signal into its antenna subspace and listening for RFID reply signals. The identification information in the RFID reply signals is stored and mapped in a three-dimensional space according to the RFID antennas that triggered the reply signals and the scan or scans during which the reply signal was received. Thus, RFID tags are associated with location cells in a three-dimensional search space adjacent to the two-dimensional RFID antenna array.

Figure 7:
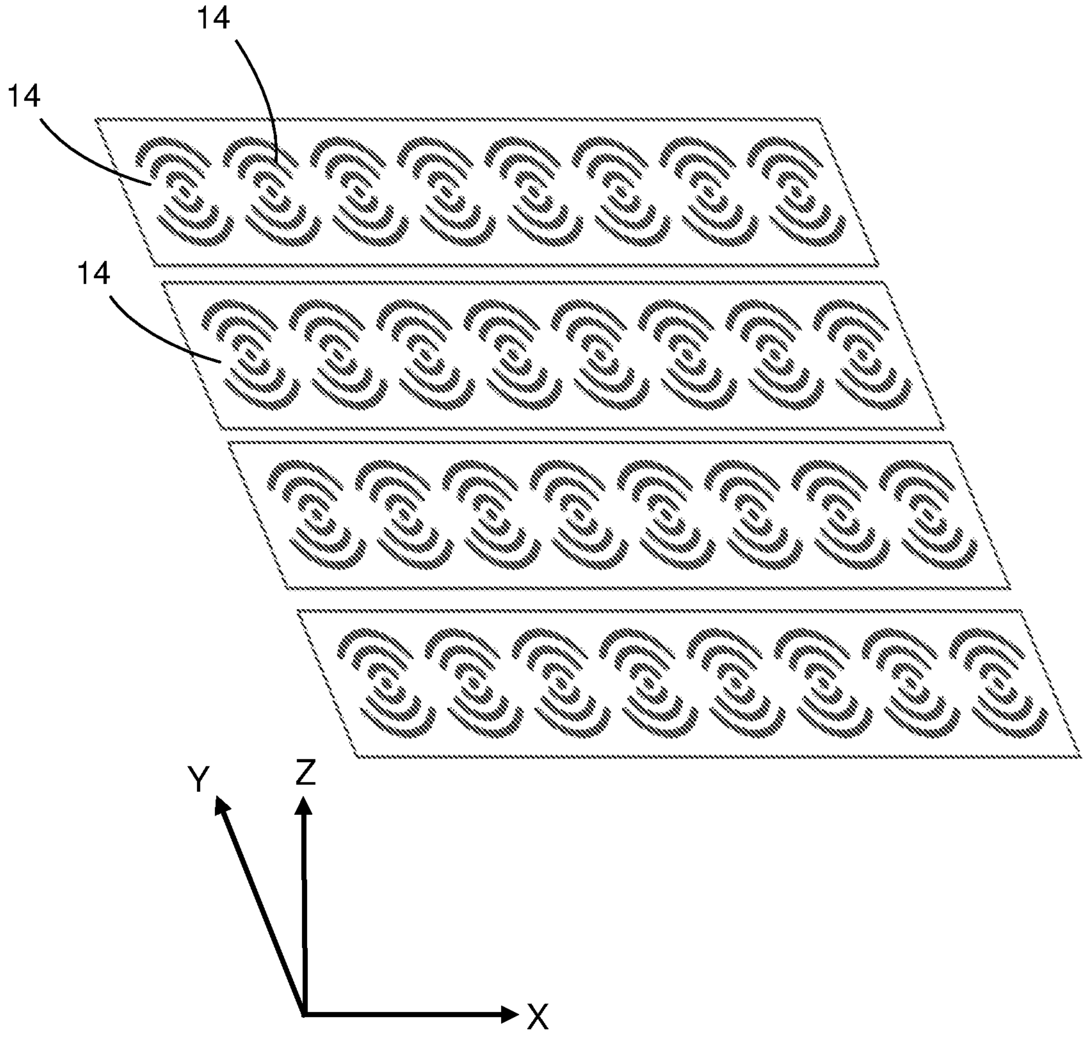
FIG. 7 shows an example of an array of RFID antennas that can be used to determine the location of RFID tags in a three-dimensional space.

By way of example, FIG. 7 shows an 8×4 array of RFID antennas 14 that may be used to determine the location of RFID tags in a three-dimensional space adjacent to the array. In this example, the number of location cells defined within the search space is equal to 32 times the number of scans performed.

Some analytical systems are deployed in a three-dimensional space that may realize advantages with a system for locating and identifying an object in a search space which uses a two-dimensional array of RFID antennas. Such systems include those employing robots to move components, consumable items and frames that include multiple consumable items within a three-dimensional workspace. Consumable items may include, by way of non-limiting examples, pipette tips and sample plates. Robotic arms may be used to manipulate automatic pipettors. Thus, the system may interrogate a three-dimensional search space that encompasses the workspace of the robotic features and consumable items to determine if all components necessary for an analysis are present and/or to determine the relative locations of object and items with respect to each other.

It should be noted that the spatial resolution used in determining RFID tag location may be improved by using additional scans at different antenna gains to increase the number of location cells. Moreover, operation is not limited to decreasing the antenna gain for each subsequent scan. Instead, the antenna gain may be increased or changed in a non-monotonic manner.

In the examples described above, the selective activation of RFID transmit antennas is performed in a sequence that proceeds in a sequential order along the array axis. In other embodiments, the order of activation of the RFID antennas for a scan may be different. For example, a simultaneous activation of multiple antennas is be implemented, resulting in a reduction in the time necessary to complete a single scan. For example, and with reference to FIG. 1, RFID antennas 14A, 14C, 14E and 14G are activated simultaneously and subsequently antennas 14B, 14D, 14F and 14H are activated simultaneously. Such a sequential order may be advantageous when the subspaces of the RFID antennas do not significantly overlap with adjacent subspaces.

While various examples have been shown and described, the description is intended to be exemplary, rather than limiting and it should be understood by those of ordinary skill in the art that various changes in form and detail may be made therein without departing from the scope of the invention as recited in the accompanying claims.

What is claimed is:

1. A method for locating and identifying one or more objects in a search space, the method comprising:

(a) providing an array of radio frequency identification (RFID) reader antennas adjacent to the search space defined by an array of location cells in which to determine the location for the one or more objects that include one or more RFID tags each secured to each object of the one or more objects, each of the RFID reader antennas configured to transmit a radio frequency (RF) signal into a subspace of the search space and to receive a reply signal from RFID tags that are present in the subspace, wherein each of the subspaces in the search space is defined by one of the location cells of the array of location cells, wherein the one or more objects are vials in a sample tray and wherein the search space is defined by the sample tray and the determined location of the vials in the sample tray, wherein each location cell includes a cell coordinate defined along an x-axis and a y-axis, and wherein each RFID antenna in the array of RFID reader antennas is configured to detect RFID tags in multiple locations;

(b) for each RFID reader antenna:

transmitting an RF signal into a respective one of the subspaces of the search space; and detecting one or more RFID reply signals if one or more RFID tags are present in the respective subspace, each of the RFID reply signals comprising identification data for a respective one of the RFID tags; and (c) determining an identity and location for one or more objects in the search space in response to the detected RFID reply signals.

2. The method of claim 1 further comprising repeating step (b) one or more times wherein, for each repetition, a gain of the RFID reader antenna is different from prior values of the gain and wherein the subspace is determined by the gain.

3. The method of claim 2 wherein the subspace of one of the RFID antennas overlaps a subspace of one or more of the other RFID reader antennas for a same gain.

4. The method of claim 2 wherein the gain of each RFID reader antenna is a receiver sensitivity gain.

5. The method of claim 2 wherein the gain of each RFID reader antenna is a transmit power gain.

6. The method of claim 2 wherein, for each repetition of step (b), the gain is decreased from a preceding gain.

7. The method of claim 6 wherein the subspace for each RFID reader antenna is decreased in response to the decrease in the gain.

8. The method of claim 6 wherein, for each repetition of step (b), transmitting an RF signal from an RFID reader antenna into a subspace is omitted if there is no RFID reply signal detected for the RFID reader antenna according to a first occurrence of step (b) or a prior occurrence of transmitting the RF signal from the RFID reader antenna into the respective subspace according to a repetition of step (b).

9. The method of claim 1 wherein each location cell includes a cell coordinate defined along an x-axis and a y-axis.

10. The method of claim 1 wherein the array of RFID reader antennas is a two-dimensional array and the search space is a three-dimensional space.

11. The method of claim 10 wherein each subspace includes a portion of a volume defining the three-dimensional space.

12. A system for locating and identifying one or more objects in a search space, comprising:

an array of radio frequency identification (RFID) reader antennas, each of the RFID reader antennas configured to transmit a radio frequency (RF) signal into a subspace of a search space defined by an array of location cells in which to determine the location for the one or more objects and to receive a reply signal from RFID tags that are present in the subspace of the search space, wherein each of the subspaces in the search space is defined by one of the location cells of the array of location cells, wherein the one or more objects are vials in a sample tray and wherein the search space is defined by the sample tray and the determined location is a location of the vials in the sample tray, wherein each location cell includes a cell coordinate defined along an x-axis and a y-axis, and wherein each RFID antenna in the array of RFID reader antennas is configured to detect RFID tags in multiple locations; and a computing system comprising a processor and a memory module, the computer system in communication with the array of RFID reader antennas, the computing system configured, for each RFID reader antenna, to cause a transmission of an RF signal into a subspace of the search space and to detect one or more RFID reply signals at the RFID reader antenna if one or more RFID tags are present in the respective subspace, each of the RFID reply signals comprising identification data for a respective one of the RFID tags, the computing system further configured to determine an identity and location for the RFID tags in the search space in response to the detected RFID reply signals.

13. The system of claim 12 wherein the computing system is further configured to repeat one or more times, for each RFID reader antenna, the transmission of the RF signal and the detection of the one or more reply signals, wherein a gain of the RFID reader antenna is different from prior values of the gain.

14. The system of claim 13 wherein the gains of the RFID reader antennas are receiver sensitivity gains.

15. The system of claim 13 wherein the gains of the RFID reader antennas are transmit power gains.

16. The system of claim 12 wherein the computing system comprises a memory module comprising computer memory hardware configured to store the identity and the location of the one or more RFID tags in the search space.

17. The system of claim 12 wherein the computing system comprises a user interface to display data corresponding to the identity and the location of the one or more RFID tags in the search space.

18. The system of claim 12 wherein each RFID tag is affixed to an object and wherein an RFID reply signal from the RFID tag includes identification data.

19. A method for locating and identifying one or more objects in a search space, the method comprising:

(a) providing an array of radio frequency identification (RFID) reader antennas adjacent to the search space defined by an array of location cells in which to determine the location for the one or more objects that include one or more RFID tags each secured to each object of the one or more objects, each of the RFID reader antennas configured to transmit a radio frequency (RF) signal into a subspace of the search space and to receive a reply signal from RFID tags that are present in the subspace, wherein each of the subspaces in the search space is defined by one of the location cells of the array of location cells, wherein the object is a chromatography column and wherein the search space is inside a column manager of a chromatography system, wherein the array of RFID reader antennas are located in the column manager of the chromatography system, and wherein each RFID antenna in the array of RFID reader antennas is configured to detect RFID tags in multiple locations;

(b) for each RFID reader antenna:

transmitting an RF signal into a respective one of the subspaces of the search space; and detecting one or more RFID reply signals if one or more RFID tags are present in the respective subspace, each of the RFID reply signals comprising identification data for a respective one of the RFID tags; and (c) determining an identity and location for one or more objects in the search space in response to the detected RFID reply signals.

* * * * *